United States Patent
Wang

(10) Patent No.: US 9,451,487 B2
(45) Date of Patent: Sep. 20, 2016

(54) METHOD FOR ADAPTIVELY MONITORING PAGING MESSAGES WITH REDUCED POWER CONSUMPTION AND COMMUNICATIONS APPARATUSES UTILIZING THE SAME

(71) Applicant: MEDIATEK INC., Hsin-Chu (TW)

(72) Inventor: Yi-Chien Wang, Hsinchu County (TW)

(73) Assignee: MEDIATEK INC., Hsin-Chu (TW)

( * ) Notice: Subject to any disclaimer, the term of this patent is extended or adjusted under 35 U.S.C. 154(b) by 120 days.

(21) Appl. No.: 14/297,610

(22) Filed: Jun. 5, 2014

(65) Prior Publication Data

US 2015/0358841 A1   Dec. 10, 2015

(51) Int. Cl.
*H04W 68/00* (2009.01)
*H04W 24/08* (2009.01)
*H04W 52/02* (2009.01)
*H04W 68/02* (2009.01)

(52) U.S. Cl.
CPC ......... *H04W 24/08* (2013.01); *H04W 52/0225* (2013.01); *H04W 68/02* (2013.01)

(58) Field of Classification Search
USPC .......................................... 455/458
See application file for complete search history.

(56) References Cited

U.S. PATENT DOCUMENTS

| | | | |
|---|---|---|---|
| 5,373,506 A * | 12/1994 | Tayloe ................. | H04B 1/1615 340/7.27 |
| 2010/0318641 A1* | 12/2010 | Bullard ................. | H04L 43/065 709/223 |
| 2012/0214488 A1* | 8/2012 | Busropan .............. | H04W 4/005 455/435.1 |

* cited by examiner

*Primary Examiner* — German J Viana Di Prisco
(74) *Attorney, Agent, or Firm* — Oblon, McClelland, Maier & Neustadt, L.L.P.

(57) ABSTRACT

A method for adaptively monitoring paging messages in a UE with a subscriber identity card camping on a cell includes: detecting a loading of a paging channel from the cell and generating a loading status; determining a monitoring pattern according to the loading status and a default monitoring pattern; and monitoring the paging channel the monitoring pattern.

16 Claims, 5 Drawing Sheets

METHOD FOR ADAPTIVELY MONITORING PAGING MESSAGES WITH REDUCED POWER CONSUMPTION AND COMMUNICATIONS APPARATUSES UTILIZING THE SAME

BACKGROUND

The disclosed embodiments of the present invention relate to wireless communications, and more particularly to a wireless communications method for monitoring paging messages with reduced power consumption, and an apparatus utilizing the same.

The term "wireless" normally refers to an electrical or electronic operation that is accomplished without the use of a "hard wired" connection. "Wireless communications", is the transfer of information over a distance without the use of electrical conductors or wires. The distances involved may be short (e.g., a few meters for television remote controls) or very long (e.g., thousands or even millions of kilometers for radio communications). The best known example of wireless communications is the cellular telephone. Cellular telephones use radio waves to enable an operator to make phone calls to another party from locations worldwide. They can be used anywhere, as long as there is a cellular telephone site to house equipment that can transmit and receive signals, which are processed to transfer both voice and data to and from the cellular telephones.

There are various well-developed and well-defined cellular communications technologies. The Global System for Mobile communications (GSM) is a well-defined and commonly adopted communications system, which uses time division multiple access (TDMA) technology. Hence, the GSM communications system employs a multiplex access scheme for digital radio, to send voice, data, and signaling data (such as a dialed telephone number) between mobile phones and cell sites. The CDMA2000 is a hybrid mobile communications 2.5G/3G (generation) technology standard, which uses code division multiple access (CDMA) technology. The UMTS (Universal Mobile Telecommunications System) is a 3G mobile communications system, which provides an enhanced range of multimedia services over the 2G GSM system. Other emerging radio access technology (RAT), such as Time Division-Synchronous Code Division Multiple Access (TD-SCDMA), Worldwide Interoperability for Microwave Access (WiMAX), and long term evolution (LTE), are still being developed.

For various cellular communications technologies, listening to paging channels and paging indicator channels or obtaining paging messages in an idle mode consumes a certain amount of battery power and may hinder data transceiving in a Packet-switched (PS) domain. Therefore, a method for smartly monitoring paging messages in an MS (mobile station)/UE (user equipment) is desired.

SUMMARY

One of the objectives of the present invention is to provide a wireless communications method for monitoring paging messages with reduced power consumption, and an apparatus utilizing the same.

According to a first aspect of the present invention, a method for adaptively monitoring paging messages in a user equipment (UE) with a subscriber identity card camping on a cell is disclosed. The method comprises: detecting a loading of a paging channel from the cell and generating a loading status; determining a monitoring pattern according to the loading status and a default monitoring pattern; and monitoring the paging channel according to the monitoring pattern.

According to a second aspect of the present invention, a communications apparatus for adaptively monitoring paging messages in a user equipment (UE) with a subscriber identity card camping on a cell is disclosed. The communications apparatus comprises a radio transceiver module and a processing module. The radio transceiver module is arranged for receiving paging messages broadcasted in a paging channel from the cell. The processing module is arranged for detecting a loading of the paging channel and generating a loading status, determining a monitoring pattern according to the loading status and a default monitoring pattern, and monitoring the paging channel according to the monitoring pattern.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is electrically connected to another device, that connection may be through a direct electrical connection, or through an indirect electrical connection via other devices and connections.

Figure 1:
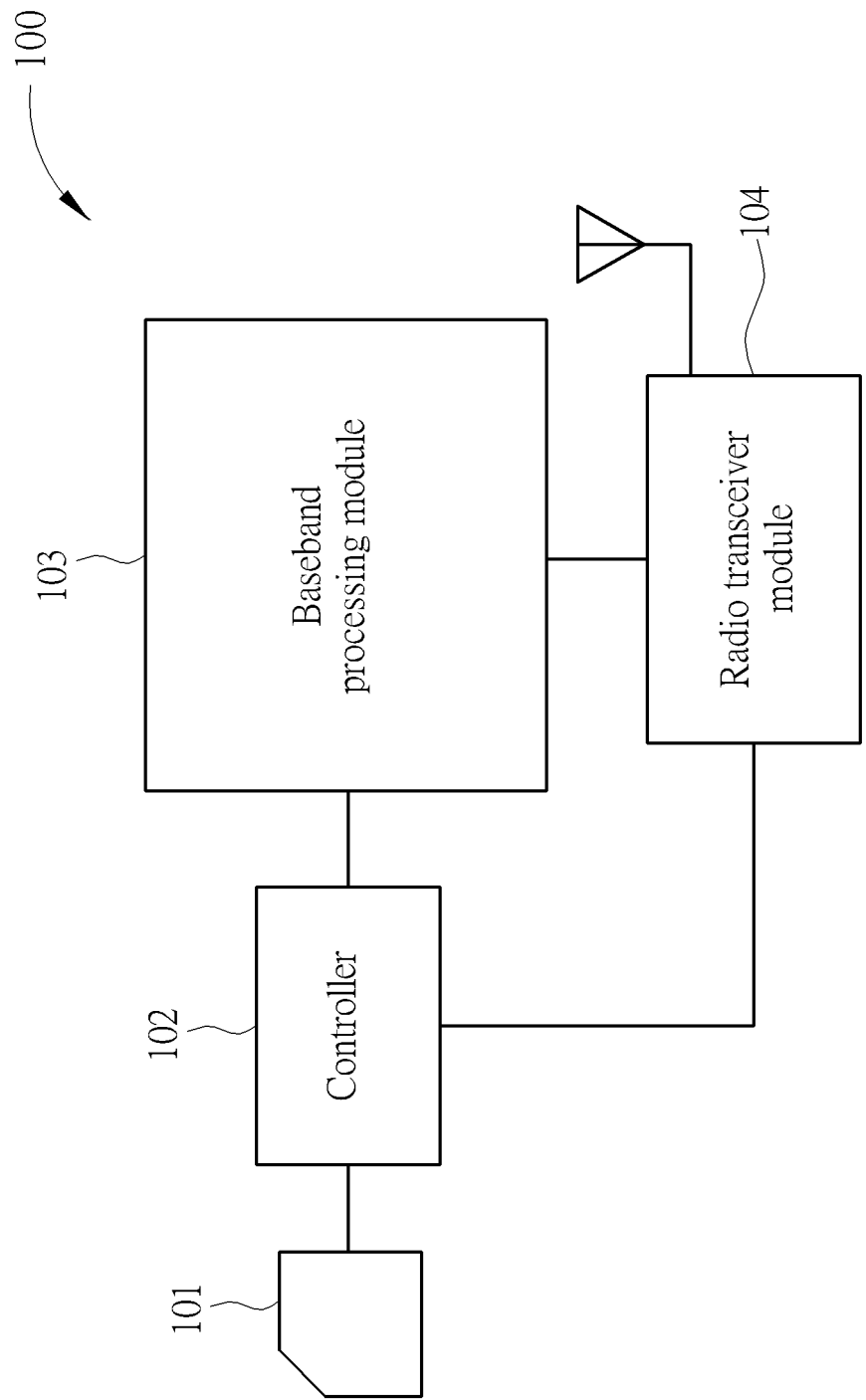
FIG. 1 shows a communications apparatus for monitoring paging messages with reduced power consumption according to an embodiment of the invention.

FIG. 1 shows a communications apparatus 100 for monitoring paging messages with reduced power consumption according to an embodiment of the invention. The communications apparatus 100 comprises a subscriber identity card 101, a controller 102, a baseband processing module 103, and a radio transceiver module 104, wherein the controller 102 is coupled to the radio transceiver module 104, the subscriber identity card 101 and the baseband processing module 103 for controlling the operations thereof.

Figure 2:
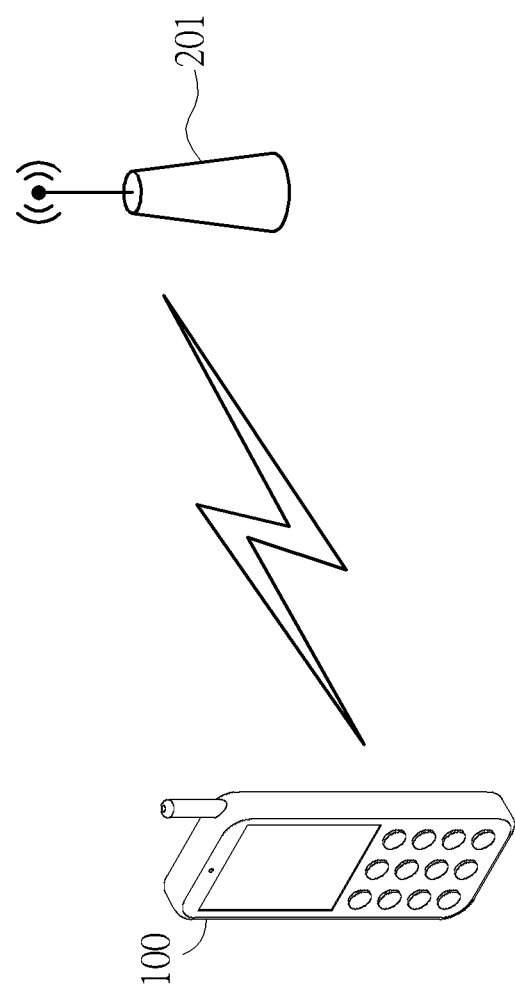
FIG. 2 shows an exemplary network topology according to an embodiment of the invention.

FIG. 2 shows an exemplary network topology according to an embodiment of the invention. The communications apparatus 100 may communicate with a wireless network through a cell belonging to the wireless network, and camp on the cell via the radio transceiver module 104, where the cell may be covered by a Node B 201 (also known as a Global System for Mobile communications (GSM) base station, a Worldwide Interoperability for Microwave Access, WiMAX advanced base station, a UMTS base station, a long term evolution, or LTE enhanced base station), as shown in FIG. 2.

Referring to FIG. 1 and FIG. 2 together, the radio transceiver module 104 receives wireless radio frequency signals from the cell 201 of the wireless network and converts the received signals to baseband signals to be processed by the baseband processing module 103, or receives baseband signals from the baseband processing module 103 and converts the baseband signals to wireless radio frequency signals to be transmitted to a peer device. The radio transceiver module 104 may comprise a plurality of hardware devices to perform radio frequency conversion. For example, the radio transceiver module 104 may comprise a mixer to multiply the baseband signals with a carrier that oscillates at the radio frequency of the wireless communications system for transmission, wherein the radio frequency may be, for example, 1900 MHz for a W-CDMA system. When the radio transceiver module 104 receives the wireless radio frequency signals from the cell 201 of the wireless network, the mixer recovers the received signal into baseband signals, and the baseband processing module 103 converts the baseband signals to a plurality of digital signals and processes the digital signals. The baseband processing module 103 may also comprise a plurality of hardware devices to perform baseband signal processing. The baseband signal processing procedure may comprise analog to digital conversion (ADC)/digital to analog conversion (DAC), gain adjustment, modulation/demodulation, encoding/decoding, etc. The subscriber identity card 101 may record a plurality of user information, and the controller 102 may read data from the plugged-in subscriber identity card 101 and write data thereto. Note that it is also feasible to integrate the controller 102 into the baseband processing module 103. To put it simply, the hardware configuration shown in FIG. 1 is for illustrative purposes only, and is not meant to be a limitation of the present invention.

According to an embodiment of the invention, the subscriber identity card 101 may relate to one kind of wireless communications system. For example, the subscriber identity card 101 may be a subscriber identity module (SIM) card of a Global System for Mobile communication (GSM), a universal subscriber identity module (USIM) card of a Universal Mobile Telecommunications System (UMTS)/LTE system, or a removable user identity module (RUIM) card or CDMA Subscriber Identity Module (CSIM) card of a CDMA2000 system. For example, the SIM/USIM card stores user account information, international mobile subscriber identity (IMSI), authentication information and a set of SIM/USIM Application Toolkit (SAT/USAT) commands, and provides storage space for text messages and phone book contacts. The controller 102 may interact with a micro control unit (MCU) of the SIM/USIM card to fetch data or SAT commands from the plugged-in SIM/USIM card.

In a communications system such as GSM, UMTS, General Packet Radio Service (GPRS), CDMA 2000, Time Division-Synchronous Code Division Multiple Access (TD-SCDMA), WiMAX or LTE communications system, the communications apparatus, also known as a mobile station (MS) or user equipment (UE), may use discontinuous reception (DRX) to reduce power consumption after camping on a cell. Take 3G FDD mobile communications system for example. In an idle mode, the communications apparatus 100 searches for or measures a Broadcast Control Channel (BCCH) which has the best signal quality from a Node B provided by a specific network operator or is synchronized to the BCCH of a specific Node B, and is therefore ready to perform a random access procedure on the Random Access Channel (RACH) when requesting a dedicated channel. In a dedicated mode, the communications apparatus 100 occupies a physical channel and tries to be synchronized with the channel. Also, the communications apparatus 100 establishes logical channels and switches between the apparatus and the Node B.

When the DRX is used, the base station or Node B (e.g. 201 of FIG. 2) may periodically transmit paging messages or paging indicators at paging occasions. The communications apparatus 100 is required to receive the paging messages carried in the paging channel (PCH) at the paging occasions if the paging indicator carried in the paging indicator channel (PICH) bursts at the corresponding radio frames of the paging occasions indicates that there's paging message carried in PCH. When the paging indicator corresponding to the communications apparatus 100 is received and is positive, the communications apparatus 100 is required to further receive the paging messages carried in the secondary common control physical channels (S-CCPCH) bursts. The communications apparatus 100 periodically monitors the PICH/PCH/S-CCPCH to avoid mobile terminated (MT) call loss, where the monitoring moments are referred to as paging occasions. The PICH is a common, time-shared indication channel used to inform the communications apparatus 100 whether a following PCH channel should be received.

Figure 3:
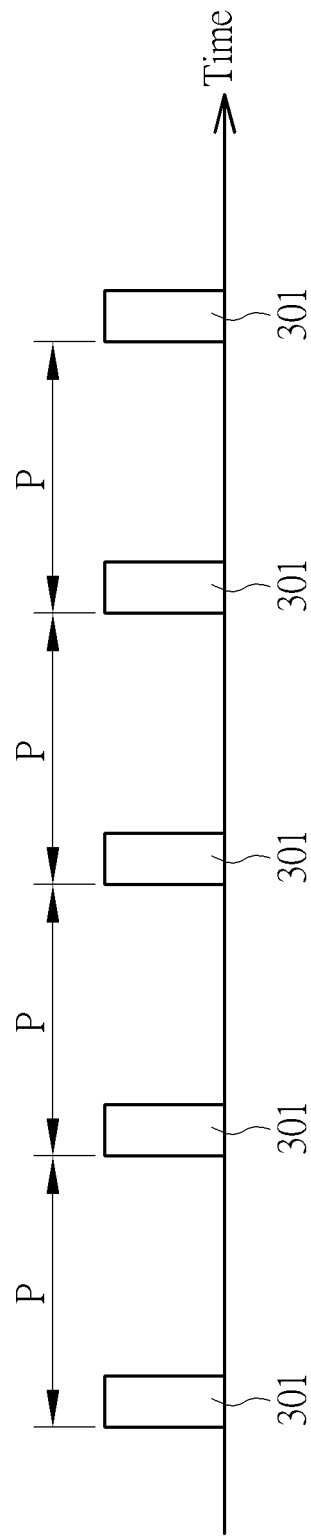
FIG. 3 shows an exemplary distribution of paging occasions and the corresponding paging period along the time axis.

FIG. 3 shows an exemplary distribution of a plurality of paging occasions 301 and the corresponding paging period P along the time axis. As illustrated in the figure, each UE performing a power saving operation may periodically wake up at its own paging occasions 301 to check up on paging indicators and associated paging messages. The paging indicator indicates whether the communications apparatus 100 should check the PCH, after noticed by the paging indicator, the communications apparatus 100 may initiate a procedure to receive an incoming call when the paging message carried in PCH includes identification (ID) of the communications apparatus 100. Otherwise, the communications apparatus 100 may sleep again and wake up at a next paging occasion.

The concept of the present invention is to dynamically switch between the operating modes of monitoring paging messages (e.g. a normal mode with a default monitoring pattern and a DRX extended mode with a new monitoring pattern which is less intensive than the default monitoring pattern as mentioned above) according to the loading of the overall paging status, so as to reduce the average power consumption. There is a typical case where paging the same UE through the paging channels is designated to be more than once on the next DRX cycle (or even once more on the next 2 DRX cycles, i.e., the network (NW) pages the same UE repeatedly in continuously three paging occasions), which intends to diminish the possibility of MT call loss. Conventionally, the communications apparatus may be configured to operate in either a normal mode with a default monitoring pattern or a DRX extended mode with a new monitoring pattern which is less intensive than the default monitoring pattern. In the normal mode, each of the communications apparatuses monitors the PCH at every paging occasion (i.e. watch the PICH every DRX cycle), and all of the paging messages are received by each of the communications apparatuses grouped on the paging occasion, so no paging message loss will occur. In the DRX extended mode, each of the communications apparatuses monitors the PCH at every two paging occasions (i.e. watch the PICH every 2 DRX cycles) for the purpose of power saving. In this way, half of the paging monitor power may be saved by the communications apparatus employing the DRX extended mode. When the communications is not busy, it can be readily realized that no paging message loss will occur as network pages each communications apparatus once more on the next DRX cycle. However, when the communications is almost fully packed, the paging message loss may happen since the paging identity information of other UE(s) may be supplanted by other paging record(s) newly inserted into the paging message.

Figure 4:
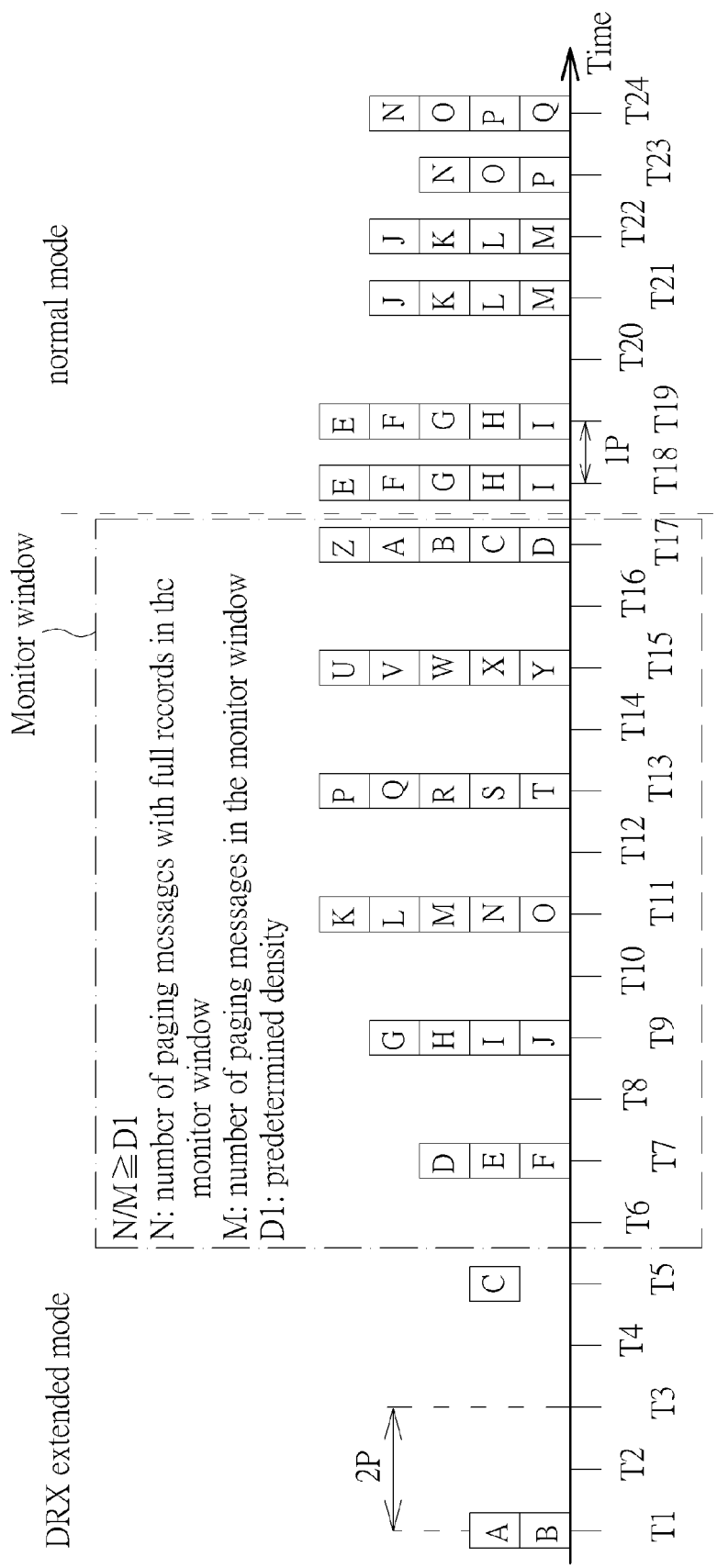
FIG. 4 shows a schematic diagram of a case where an exemplary method is employed for adaptively monitoring paging messages according to an embodiment of the invention.

As a result, if the loading of communications is not taken into account, the DRX extended mode will lead to a risky situation even if the DRX extended mode is running under a paging system which can page repeatedly. On the other hand, if the loading of communications is taken into account, the DRX extended mode will not lead to a risky situation even if the DRX extended mode is running under a paging system which don't page repeatedly. To be specific, when a paging message which is not discardable is skipped due to the DRX extended mechanism, an attempt to page the UE will be made again after several DRX cycles since no reply, where the re-paging timing is determined randomly, thus there is a high rate that the UE with the DRX extended mechanism can be successfully paged sooner or later. Please refer to FIG. 4 in conjunction with FIG. 5 for the details of the invention. FIG. 4 shows a schematic diagram illustrating a case where an exemplary method is employed for adaptively monitoring paging messages according to an embodiment of the invention. The case demonstrates that the normal mode is entered from the DRX extended mode when a specific criterion is met in a monitor window, i.e. N (a counter for counting the number of paging messages with full records in the monitor window)/M (a counter for counting the number of paging messages in the monitor window) ≥D1 (a predetermined density). In other cases, the DRX extended mode may also be entered from the normal mode when an opposite criterion is met in the monitor window.

Figure 5:
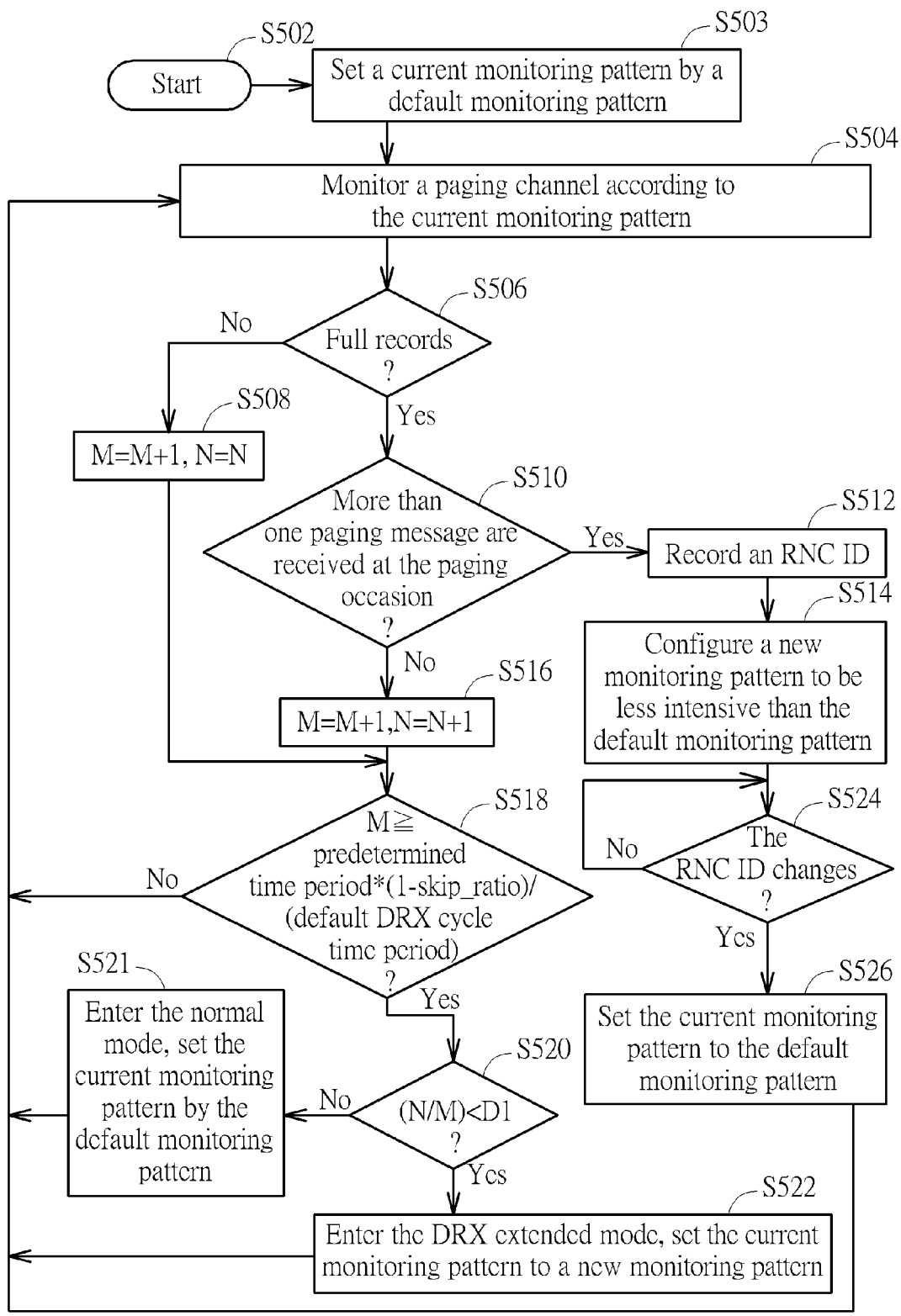
FIG. 5 shows a method for adaptively monitoring paging messages according to an embodiment of the invention.

FIG. 5 is a flowchart illustrating the exemplary method for adaptively monitoring paging messages according to an embodiment of the invention. The method is performed by a user equipment (UE) (e.g. 100 in FIG. 1/FIG. 2) with a subscriber identity card camping on a cell (e.g. 201 in FIG. 2). The method may be considered to start in a scenario such as the UE being powered on. In other cases, the UE may execute the method of FIG. 5 continuously/periodically or at a specific situation (S502). After the flow starts, the UE monitors the loading of the paging status, and then adaptively determines a corresponding strategy. First, the UE sets a current monitoring pattern by a default monitoring pattern (S503), and then the UE monitors/listens to a paging channel according to a current monitoring pattern (step S504) to obtain paging messages (i.e. monitors/listens to the paging channel for every default DRX cycle time period), wherein the UE receives the paging message via a radio transceiver module thereof (e.g. 104 in FIG. 1). By way of example and without any limitation, the default monitoring pattern may be a setting for a normal mode where paging messages are received at each paging occasion, i.e. the default DRX cycle time period=1 DRX cycle time period.

Next, a baseband processing module of the UE (e.g. 103 in FIG. 1) checks if the paging message is full of identity information records (S506). The capacity of each paging message may be a constant value in certain countries or regions depending on the local network operators, and the constant value can therefore be predetermined. By way of example and without any limitation, it is also feasible for the UE itself to derive a statistical value on the fly if there is no prior information regarding the capacity of each paging message. For example, a maximum number of identity information records carried by a paging message broadcasted in the paging channel within a period of time may be recorded, wherein no other paging message broadcasted in the paging channel within a different predetermined time period carries the number of identity information records that is larger than the maximum number. The subsequent paging messages, each carrying the number of identity information records equaling the maximum number, are regarded as full of identity information records (i.e. full pages). Furthermore, if the PICH indicates that there is no paging message broadcasted at the current paging occasion, it will be regarded as the recorded is not full in this case.

If the current paging message is determined to be not full, a counter N for counting the number of the paging messages which are determined as full pages will be kept the same, and the counter M for counting a total paging message number will be increased by 1 (S508). If the current paging message is determined full and it is found that more than one paging message is received at the same paging occasion (S510), a radio network controller (RNC) by which the cell is governed will be recorded (S512). The reason to identify if the current paging message includes more than one paging message can be explained from a practical point of view. In practice, some network operators are capable of broadcasting more than one paging message at each paging occasion; therefore, the issue of repeated paging identity information being supplanted by other paging record does not have a chance to happen since the PCH data capacity is twice as much as normal (or may be even more). In other words, the paging message loss will not take place as the network operator can send more than one paging message at a single paging occasion. In such a situation, it is quite safe to extend the DRX cycle time period, and thus a new monitoring pattern less intensive than the default monitoring pattern may be adopted (S514). By way of example and without any limitation, the monitoring pattern is switched back to the default monitoring pattern when UE moves to another RNC which is not recorded to have more than one paging message in the same paging occasion (S524 & S526). Also, when the RNC ID changes, the flow will return to step S504 for repeating the monitoring process according to the current monitoring pattern (i.e. the default monitoring pattern). If the current paging message is determined full and only one paging message is received at the paging occasion, the counter N for counting the full paging message number and the counter M for counting the total paging message number will both be increased by 1 (S516).

The UE checks if M≥a predetermined time period*(1−skip_ratio)/(the default DRX cycle time period) (S518), wherein skip_ratio indicates a percentage of the bypassed (ignored) paging occasions in respect of the total paging occasions (e.g. skip_ratio=0 in the normal mode, and 0<skip_ratio<1 in the DRX extended mode), and the predetermined time period is a monitor window for ensuring an adequate sample space (i.e. the paging occasions), so that a statistical result of the paging loading can be reliable. If the predetermined time period is not fulfilled, the flow will return to step S504 for repeating the monitoring process; however, if the predetermined time period is reached, the flow will go to step S520. In step S520, a density of the full page in the predetermined time period is calculated by dividing N by M. By way of example and without any limitation, the density of the full page may be calculated after all pages within the predetermined time period are checked by the UE, or the density may be calculated in a real-time manner whenever a new page is checked. However, this is for illustrative purpose only, and the details of computing the density may be modified to any other alternative function which achieves the same objective and complies with the concept of the invention. For example, in the DRX extended mode, the determination of whether the skipped paging message is full may be made according to a previous non-skipped paging message, or the skipped paging message may be directly determined to be full or not full blindly. It should be noted that the alternative designs all belong to the scope of the invention.

If the density is lower than a predetermined density D1, wherein D1 may be a value between 1 and 0 (e.g. D1=10%), a DRX extended mode with a new monitoring pattern which is less intensive than the default monitoring pattern of the normal mode will be adopted (S522), and the UE sets the current monitoring pattern by the new monitoring pattern. Next, the flow will return to step S504 for repeating the monitoring process according to the current monitoring pattern (i.e. the new monitoring pattern in this case).

If the density is not lower than the predetermined density D1, the normal mode with the default monitoring pattern will be adopted (S521), and the UE sets the current monitoring pattern by the default monitoring pattern. Next, the flow will also return to step S504 for repeating the monitoring process according to the current monitoring pattern (i.e. the default monitoring pattern in this case).

By way of example and without any limitation, the condition and the corresponding new monitoring pattern of step S520 may be even more complex. For instance, when the density is greater than or equal to 50%, the UE will remain in the normal mode to monitor page at every paging occasion; when the density is greater than or equal to 30% and less than 50%, the UE will be switched to a first DRX extended mode with a pattern of 7 out of 8 paging occasions; when the density is greater than or equal to 10% and less than 30%, the UE will be switched to a second DRX extended mode with a pattern of 3 out of 4 paging occasions; when the density is less than 10%, the UE will be switched to a third DRX extended mode with a pattern of 1 out of 2 paging occasions. In this way, the UE can adaptively determine whether the received paging message comprises identity information corresponding to the subscriber identity card of the UE in the monitored paging channel in at least one DRX extended mode, which saves power and avoids paging message loss.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for adaptively monitoring paging messages in a user equipment (UE) with a subscriber identity card camping on a cell, comprising:
   detecting a loading of a paging channel from the cell and generating a loading status;
   determining a monitoring pattern according to the loading status and a default monitoring pattern;
   monitoring the paging channel according to the monitoring pattern; and
   generating the loading status by detecting a number of paging messages received from the cell at a same paging occasion.

2. The method as claimed in claim 1, wherein the step of detecting the loading of the paging channel and generating the loading status comprises:
   monitoring the paging channel according to the monitoring pattern;
   counting a number of paging messages which are broadcasted in the paging channel and are full of identity information records within a first predetermined time period; and
   generating the loading status according to the number.

3. The method as claimed in claim 2, further comprising:
   recording a maximum number of identity information records carried by a paging message broadcasted in the paging channel;
   wherein within the first predetermined time period, a paging message with a number of identity information records not smaller than the maximum number is regarded as being full of identity information records.

4. The method as claimed in claim 1, wherein the step of determining the monitoring pattern according to the loading status and the default monitoring pattern comprises:
   when the loading status indicates that the loading of the paging channel is lower than a threshold value, setting the monitoring pattern to be less intensive than the default monitoring pattern.

5. The method as claimed in claim 1, wherein the step of determining the monitoring pattern according to the loading status and the default monitoring pattern comprises:
   when the loading status indicates that the loading of the paging channel is not lower than a threshold value, employing the default monitoring pattern to act as the monitoring pattern.

6. The method as claimed in claim 1, wherein the step of determining the monitoring pattern comprises:
   when the number of paging messages received from the cell at the same paging occasion is found to be greater than a threshold value, setting the monitoring pattern to be less intensive than the default monitoring pattern.

7. The method as claimed in claim 6, wherein the step of setting the monitoring pattern to be less intensive than the default monitoring pattern comprises:
   keeping the monitoring pattern to be less intensive than the default monitoring pattern until the UE moves to another RNC which is not recorded to broadcast multiple paging messages at a same paging occasion.

8. The method as claimed in claim 1, further comprising:
   determining whether a received paging message comprises identity information corresponding to the subscriber identity card of the UE in the monitored paging channel.

9. A communications apparatus for adaptively monitoring paging messages in a user equipment (UE) with a subscriber identity card camping on a cell, comprising:
   a radio transceiver module, arranged for receiving paging messages broadcasted in a paging channel from the cell; and
   a processing module, arranged for detecting a loading of the paging channel and generating a loading status, determining a monitoring pattern according to the loading status and a default monitoring pattern, and monitoring the paging channel according to the monitoring pattern, wherein the processing module generates the loading status by detecting a number of paging messages received from the cell at a same paging occasion.

10. The communications apparatus as claimed in claim 9, wherein the processing module monitors the paging channel according to the monitoring pattern, counts a number of paging messages broadcasted in the paging channel which are full of identity information records within a first predetermined time period, and generates the loading status according to the number.

11. The communications apparatus as claimed in claim 10, wherein the processing module records a maximum number of identity information records carried by a paging message broadcasted in the paging channel, and regards subsequent paging messages with a number of identity information records not smaller than the maximum number within the first predetermined time period as being full of identity information records.

12. The communications apparatus as claim 9, wherein when the loading status indicates that the loading of the paging channel is lower than a threshold value, the processing module sets the monitoring pattern to be less intensive than the default monitoring pattern.

13. The communications apparatus as claimed in claim 9, wherein when the loading status indicates that the loading of the paging channel is not lower than a threshold value, the processing module employs the default monitoring pattern to act as the monitoring pattern.

14. The communications apparatus as claimed in claim 9, wherein when the number of paging messages received from the cell at the same paging occasion is found to be greater than a threshold value, the processing module sets the monitoring pattern to be less intensive than the default monitoring pattern.

15. The communications apparatus as claimed in claim 14, wherein the processing module keeps the monitoring pattern to be less intensive than the default monitoring pattern until the UE moves to another RNC which is not recorded to broadcast multiple paging messages at a same paging occasion.

16. The communications apparatus as claimed in claim 9, wherein the processing module determines whether a received paging message comprises identity information corresponding to the subscriber identity card of the UE in the monitored paging channel.

* * * * *